(12) United States Patent
Ferrero et al.

(10) Patent No.: US 9,180,639 B2
(45) Date of Patent: *Nov. 10, 2015

(54) METHOD OF FORMING A FRONTAL TOOTHING ON AN INNER RING OF A WHEEL HUB

(75) Inventors: Alessandro Ferrero, Turin (IT); Enrico Morello, Roletto (IT); Fulvio Nicastri, Garzigilana (IT); Davide Antonio Olivieri, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 655 days.

This patent is subject to a terminal disclaimer.

(21) Appl. No.: 13/551,104

(22) Filed: Jul. 17, 2012

(65) Prior Publication Data

US 2013/0181375 A1 Jul. 18, 2013

(51) Int. Cl.
*B29D 99/00* (2010.01)
*B21K 21/12* (2006.01)
*B21K 25/00* (2006.01)
(Continued)

(52) U.S. Cl.
CPC ............... *B29D 99/0032* (2013.01); *B21J 5/12* (2013.01); *B21J 9/025* (2013.01); *B21J 13/02* (2013.01); *B21K 1/30* (2013.01); *B21K 21/12* (2013.01); *B21K 25/00* (2013.01); *B60B 27/0031* (2013.01); *B60B 2310/208* (2013.01); *B60B 2900/113* (2013.01)

(58) Field of Classification Search
CPC .......... B21K 21/12; B21K 1/30; B21K 25/00; B21J 5/12; B21J 9/025; B21J 9/06; B21J 9/18; B29D 99/0032; B60B 2310/2082; B60B 2310/208; B29C 59/022; B29C 2043/023; B29C 43/027; B29C 2043/028; B29C 53/00; B29C 67/0029; B29C 67/0048; B28B 1/02; B28B 21/92; B28B 21/98
USPC .......... 264/293, 294, 296, 339, 299; 29/894.36, 898.06, 898.04, 898.07, 29/894.361, 894.362, 898.062; 72/67, 72/112, 115, 118, 120, 121; 301/105.1; 384/544, 589
See application file for complete search history.

(56) References Cited

U.S. PATENT DOCUMENTS

| 4,893,960 A | 1/1990 | Beier et al. |
| 2007/0214624 A1 | 9/2007 | Oliver et al. |
| 2007/0217728 A1 * | 9/2007 | Kashiwagi et al. ........... 384/544 |

(Continued)

FOREIGN PATENT DOCUMENTS

| JP | 2011031682 A | 2/2011 |
| WO | WO 2009139137 A1 * | 11/2009 .................. B21J 9/02 |

*Primary Examiner* — Yogendra Gupta
*Assistant Examiner* — Ninh Le
(74) *Attorney, Agent, or Firm* — Bryan Peckjian; SKF USA Inc. Patent Dept.

(57) ABSTRACT

A method including the steps of forming an inner ring of a wheel hub, by joining a spindle and an insert ring fitted onto the spindle, on a side of a first end of the spindle; axially blocking the insert ring on the spindle by plastically deforming the first end of the spindle that forms an upset collar therewith, which axially protrudes from the insert ring; frontally obtaining on the collar, on the side opposite to the insert ring, a frontal toothing by means of a single creator tool, towards the collar, with a toothing complementary to that to be obtained, by axially impressing onto the collar, in sequence, one or more teeth of the complementary toothing by eccentrically pushing the creator tool against the collar while the creator tool is held substantially coaxial to the wheel hub, thus acting peripherally in sequence on the whole creator tool.

7 Claims, 3 Drawing Sheets

(51) Int. Cl.
*B21J 5/12* (2006.01)
*B21J 9/02* (2006.01)
*B21J 13/02* (2006.01)
*B21K 1/30* (2006.01)
*B60B 27/00* (2006.01)

(56) References Cited

U.S. PATENT DOCUMENTS

2010/0146790 A1\* 6/2010 Gingrich .................. 29/898
2010/0275433 A1 11/2010 Oliver et al.

\* cited by examiner

METHOD OF FORMING A FRONTAL TOOTHING ON AN INNER RING OF A WHEEL HUB

CROSS-REFERENCE TO RELATED APPLICATION

This U.S. Non-Provisional Utility application claims the benefit of copending Italy Provisional Patent Application Serial No. TO2011A000701, filed on 29 Jul. 2011, which is incorporated herein in its entirety.

FIELD OF THE INVENTION

The present invention relates to a method of forming a frontal toothing on an inner ring of a wheel hub by means of plastic deformation. In particular, the present invention is applied to a wheel hub, the inner ring of which comprises a spindle, provided with a first rolling race for a first crown of rolling bodies, and an insert ring, provided with a second rolling track for a second crown of rolling bodies, wherein the insert ring is axially blocked onto the spindle by means of an upset collar, defined by an end section of the spindle which was plastically deformed.

BACKGROUND OF THE INVENTION

In the wheel hubs of the aforesaid type, the mentioned frontal toothing has the purpose of coupling head-to-head the inner ring of the wheel hub and a corresponding frontal toothing of an outer ring of a constant velocity joint, to ensure the torque transmission from the constant velocity joint to the inner ring of the wheel hub, which carries a wheel of the vehicle by means of a flanged end thereof. A coupling of this type is described in U.S. Pat. No. 4,893,960, which also teaches how to make the frontal toothing on the inner ring of the wheel hub. In particular, the frontal toothing is obtained using the so-called "orbital forming" method simultaneously with the forming of the upset collar by means of a tool including a truncated-cone-shaped element which upsets the collar and a frontally toothed tubular element, axially slidingly mounted on the truncated-cone-shaped element, which impresses the toothing onto the collar still during the step of deforming. A radially outer element of the toothed tubular element, which may either belong to the same tool or be a second separate tool, controls the radially outward deformation of the collar.

Although a forming method like that described in U.S. Pat. No. 4,893,960 is satisfactory, it requires the use of a relatively complex tool and especially does not provide toothings with features of absolute tooth profile constancy, which feature is absolutely necessary nowadays in view of the ever increasing transmitted torques.

It is thus the object of the present invention to provide a method of forming a frontal toothing on an inner ring of a wheel hub by means of plastic deformation, which is an alternative to the methods of the prior art, and in particular is capable of ensuring a higher dimensional accuracy of the teeth and maintaining a high dimensional and geometrical constancy in the profile of the teeth themselves.

SUMMARY OF THE INVENTION

According to the present invention, a method of forming a frontal toothing on an inner ring of a wheel hub by means of plastic deformation is thus provided as defined in claim 1.

The fact that, according to the invention, the frontal toothing is impressed by means of a single forming tool which is however only indirectly actuated by a tool which performs a motion entirely similar to that used for the orbital forming, surprisingly allows to obtain frontal toothings by means of plastic deformation in which the tooth profile is kept substantially constant, thus ensuring a higher dimensional accuracy of the teeth thus obtained. Therefore, better and more accurate couplings are obtained between the inner ring of the wheel hub and the constant velocity joint, which allow more effective, quieter and higher capacity torque transmissions to be obtained.

Furthermore, the required frontal toothing is obtained with a lower energy consumption and the same orbital forming apparatus used to make the upset collar, simply equipped in a appropriate manner, can be used to carry out the method of the invention.

BRIEF DESCRIPTION OF THE DRAWINGS

Further features and advantages of the present invention will become apparent from the following description of non-limitative embodiments, made with reference to the accompanying drawings, in which FIG. 1 diagrammatically shows in radial section a longitudinal elevation view of a wheel hub provided with a frontal toothing made according to the invention.

DETAILED DESCRIPTION OF THE INVENTION

Figure 1:
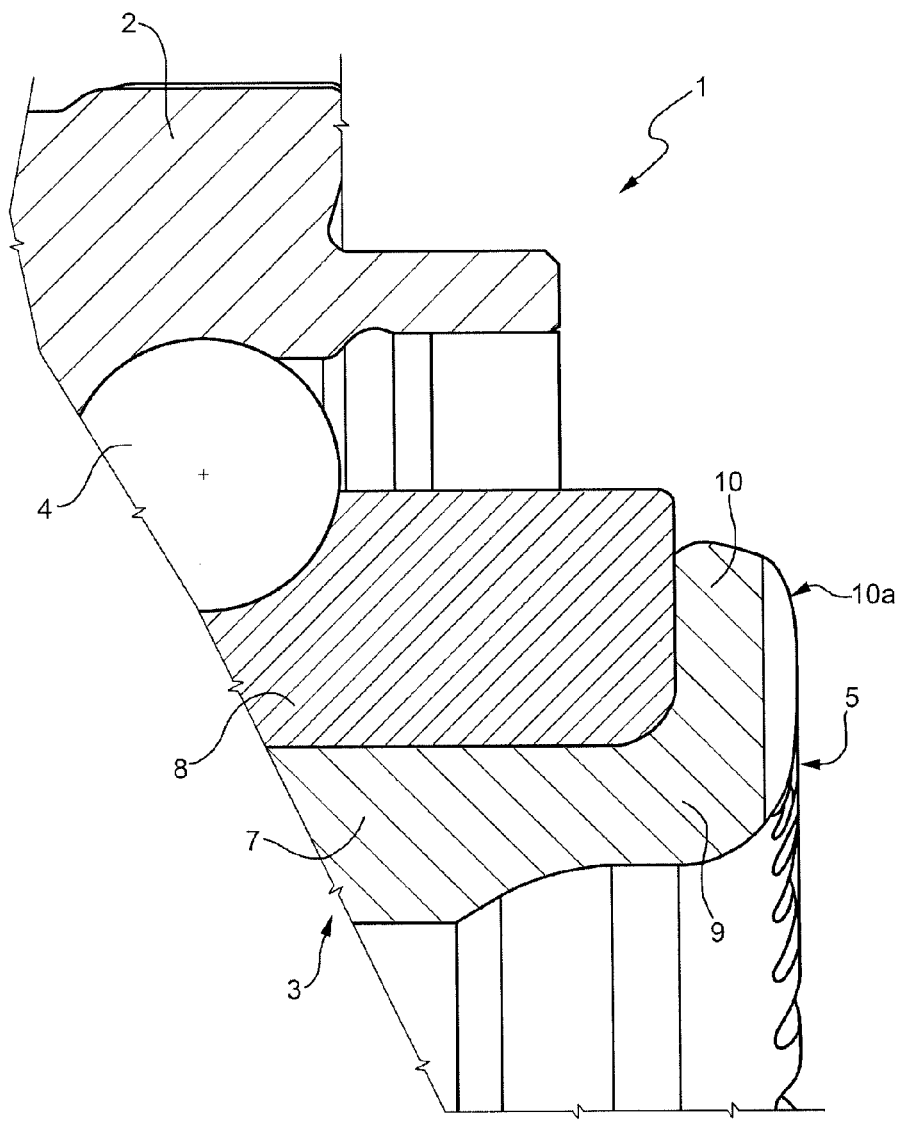

With reference to FIG. 1, numeral 1 indicates as a whole a wheel hub, known per se, comprising an outer ring 2, intended to be restrained in use to an upright of a vehicle suspension in a known manner, and an inner ring 3, between which two crowns of rolling bodies 4 are arranged (only one is shown in FIG. 1). The inner ring 3 can be operatively associated, in use, to a constant velocity joint (known and not shown for simplicity) by means of a frontal toothing 5 and is provided with holding means 6 defined by a flange (FIG. 2) for a vehicle wheel.

In particular, according to a known configuration, the inner ring 3 comprises a spindle 7, with which the flange 6 is integrally obtained in one piece, and an "insert" ring 8 fitted onto a terminal end 9 of the spindle 7 facing the opposite side of flange 6 and, in use, the mentioned constant velocity joint; inner ring 3, spindle 7 and ring 8 are reciprocally coaxial.

Ring 8 is axially blocked onto spindle 7 by means of an upset collar 10 obtained by means of plastic deformation of the terminal end 9; collar 10 axially protrudes from ring 8 and carries the frontal toothing 5 obtained on a terminal frontal face 10a thereof arranged substantially perpendicular to the axis of symmetry A (FIG. 2) of the wheel hub 1, in general, and of the inner ring 3, in particular.

Figure 2:
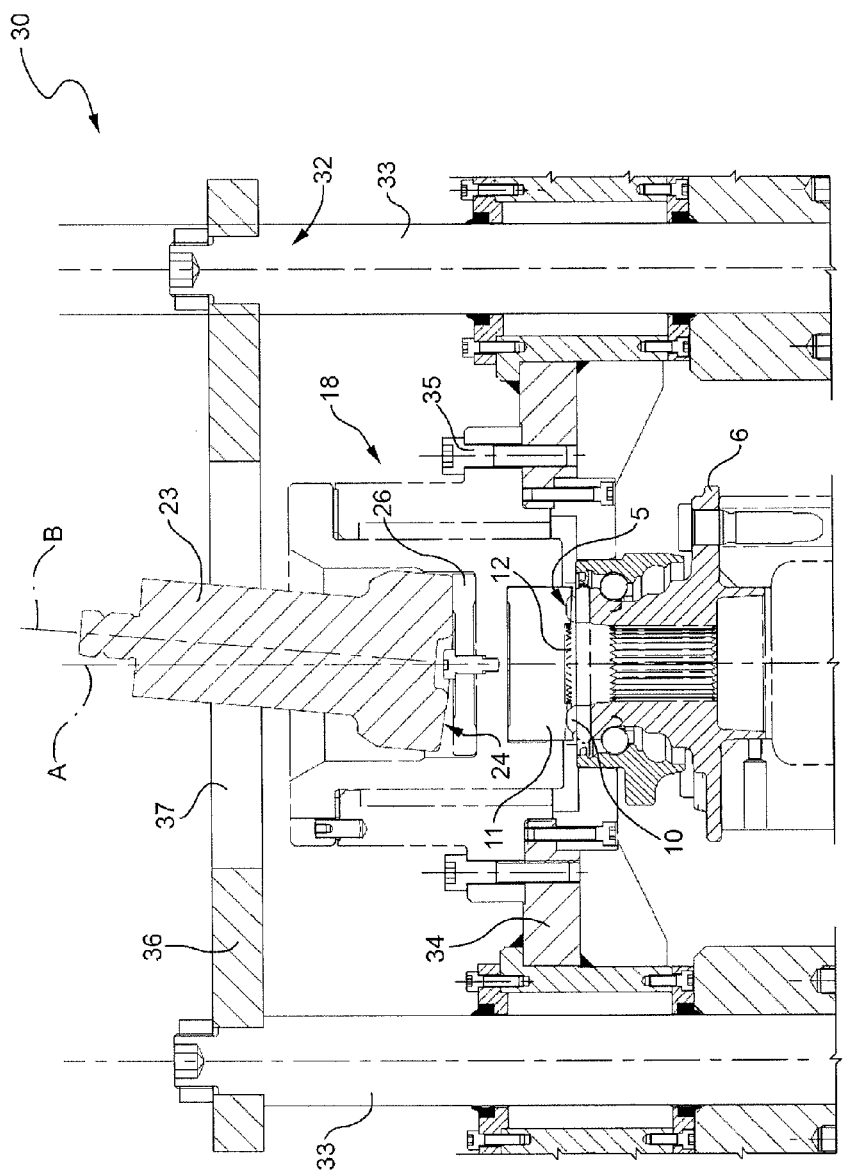
FIG. 2 shows on reduced scale the wheel hub in FIG. 1 during a step of the forming method according to the invention, and a diagrammatic elevation view in radial section of an apparatus to carry out the method of the invention.

With reference now to FIG. 2, toothing 5 is obtained by means of a method which greatly differs from those known from the prior art.

In particular, the method of forming the toothing 5 by means of plastic deformation according to the invention comprises the steps of: forming the inner ring 3 of the wheel hub 1 as the joining of spindle 7 and ring 8, and then axially blocking ring 8 onto spindle 7 by forming collar 10 by means of the plastic deformation of the end 9; this step is carried out in a known manner, e.g. using the so-called "orbital forming" process; and the step of frontally impressing the frontal toothing 5 onto collar 10, on the side opposite to ring 8.

However, according to the method of the present invention, the step of impressing the frontal toothing 5 onto collar 10 is carried out only after the step of properly forming the upset collar 10, in sequence after the end of such a step of forming collar 10, directly onto the finished upset collar 10.

Figure 3:
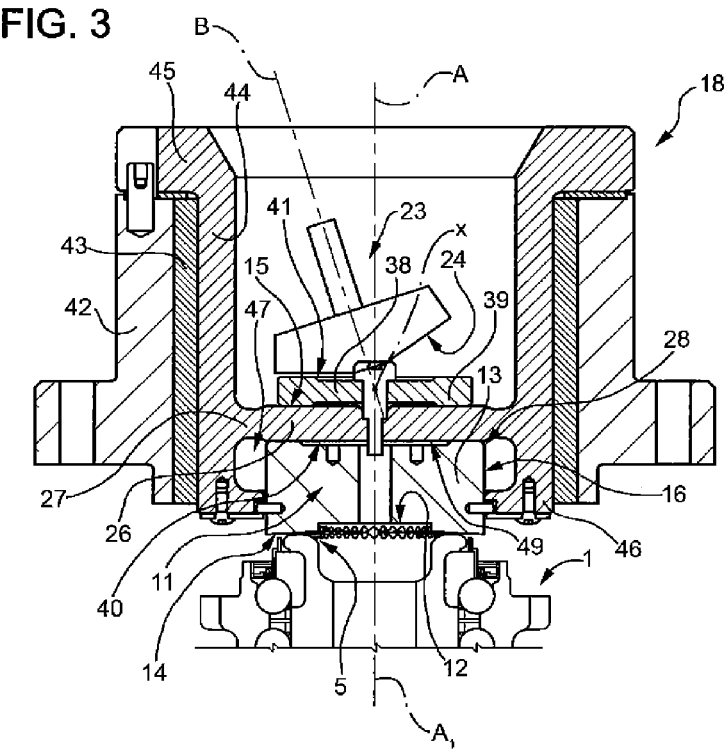
FIG. 3 shows on enlarged scale a detail of the apparatus in FIG. 2 when carrying out a step of the method of the invention.

In combination with this selection of a particular sequence of steps, the step of impressing the frontal toothing 5 is carried out by axially impressing a single, cylindrical-symmetry creator tool 11 on the collar 10, provided with a toothing 12 towards the collar 10, which toothing is complementary to that to be obtained and has axis of symmetry A1 (FIG. 3).

According to the invention, toothing 5 is thus made by axially impressing onto the collar 10, in sequence, one or more teeth of the complementary toothing 12, eccentrically pushing the creator tool 11 against collar 10, while the creator tool 11 is held substantially coaxial to the wheel hub 1, i.e. so that its axis of symmetry A1 coincides with the axis of symmetry A of the wheel hub 1, thus acting peripherally in sequence on the whole creator tool 11.

Hereinafter, the term "eccentrically" is used to indicate that the centre of application of the exerted thrust is arranged laterally off-axis with respect to the axis of symmetry A1 of tool 11.

The creator tool 11 (FIG. 3) consists of a cylindrical metal block 13 delimited by a bottom base face 14 provided with a complementary toothing 12, by a top base face 15 and by a cylindrical lateral wall 16. As it will be described in greater detail below, according to an aspect of the invention, the creator tool 11 is held with face 14 facing collar 10 by gripping the tool 11 only at the lateral wall 16, by means of a supporting structure 18.

The creator tool 11 is eccentrically pushed against collar 10 using a pressing head 23 (only diagrammatically shown in FIG. 3) frontally delimited by a conical surface 24, by rotating head 23 about an axis B, which is the axis of symmetry of head 23 and is arranged inclined with respect to the axis of symmetry A of the wheel hub 1, and simultaneously rotating axis B (and the head 23 therewith), with a precession motion, about the axis of symmetry A of the wheel hub 1.

Furthermore, according to a further aspect of the invention, the creator tool 11 is eccentrically pushed against collar 10 in an indirect manner only, by means of a passive element 26 interposed between the creator tool 11 and an active element, consisting of the pressing head 23, which exerts an eccentric thrust on the passive element 26.

In particular, an elastically deformable, circular flat metal plate 26 is used as passive element, having its axis of symmetry coinciding with axes A and A1, which plate 26 is frontally held against the creator tool 11, from the side opposite to the complementary toothing 12, thus resting against the face 15 by means of a peripherally outer, thinned edge 27 thereof (FIG. 3).

Edge 27 is made to radially project from a corresponding radially outer edge 28 of the creator tool 11 (which edge 27 is thus arranged so as to also laterally protrude from the lateral wall 16) and is restrained by means of a restraining joint to the supporting structure 18 of the creator tool 11.

During the step of impressing the creator tool 11 against the upset collar 10, the wheel hub 1 is both axially and radially supported and blocked with respect to the axis of symmetry A thereof, and is further held with its inner ring 3 angularly blocked, so that it cannot rotate about the axis of symmetry A.

With reference to FIG. 2, this is obtained by means of an apparatus 30 comprising a base 31 (not shown for simplicity), which supports a gantry-shaped frame 32 comprising columns 33, arranged preferably vertical, along which a crosspiece 34, which removably supports the supporting structure 18, e.g. by means of screws 35, runs parallel to axis A. The frame 32 further comprises a fixed crosspiece 36 fitted across the top of the columns 33 and provided with a through compartment 37 in which the head 23 may descend to come into cooperation with the plate 26 and the creator tool 11 underneath to then be actuated in the described manner.

Ring 3 is directly supported in an integral manner by the base of apparatus 30, e.g. by means of its flange 6, and the supporting structure 18 also forms an integral part of apparatus 30, which is integrally restrained to the movable crosspiece 34 in a removable manner. Without the supporting structure 18, apparatus 30 is substantially the same as that used for making the collar 10 by means of orbital forming.

Similarly, the same apparatus previously used to obtain collar 10 by means of orbital forming, is used to eccentrically push the creator tool 11 against the collar 10 simply by replacing the forming tool by means of which collar 10 was obtained with the head 23.

A flat, anti-wear plate 38 (FIG. 3), which is directly fixed to the passive element 26, is arranged between the passive element 26 and the active element, consisting of the pressing head 23, which plate is directly fixed to the passive element consisting of the plate 26, in direct contact with a flat upper surface 39 of plate 26, opposite to a corresponding flat lower surface 40 of plate 26, which cooperates directly in contact with the creator tool 11.

The point, indicated by X in FIG. 3, where the axis B intercepts the axis of symmetry A of the wheel hub 1 and the axis of symmetry A1 of the tool 11 is chosen so as to be substantially coplanar with the contact surface 24 of the pressing head 23, in the example shown, therefore with an upper surface 41 of the anti-wear plate 38 which directly faces the pressing head 23 in use.

With reference to FIG. 3, the supporting structure 18 is made so as to provide a self-bearing unit along with the tool 11, so as to easily and rapidly remove the latter from apparatus 30 which may then be used for various machining operations, e.g. for also making collar 10, as previously noted. Furthermore, the supporting structure 18 is made so as to optimize the distribution of stresses on the tool 11, so that this can work better.

The supporting structure 18 comprises: a flanged cylindrical bush 42, made so as to form an essentially rigid element and fixed directly onto the crosspiece 34; a bush 43 inserted and fitted into the bush 42; and a second cylindrical bush 44 provided with an end flange 45 which carries the plate 26 integrally obtained in one piece therewith.

In particular, bush 44 is inserted through bush 43, with the flange 45 abutting against the bush 42 and an end 46 thereof protruding from bush 43 from the side opposite to flange 45; plate 26 is arranged near the end 46, within bush 44, to which it is connected by means of the thinned edge 27 and creates, along with the end 46 which has the edge radially in relief towards the interior of bush 44, a housing seat 47 for tool 11. This is abuttingly supported against plate 26 by the edge in relief of the end 46 by means of a series of radial pins 48, which are inserted into the block 13 through the lateral wall 16. The face 15, which is immediately in contact with the surface 40 of plate 26, has a central shallow recess 49 to reduce its contact surface with plate 26.

Figure 4:
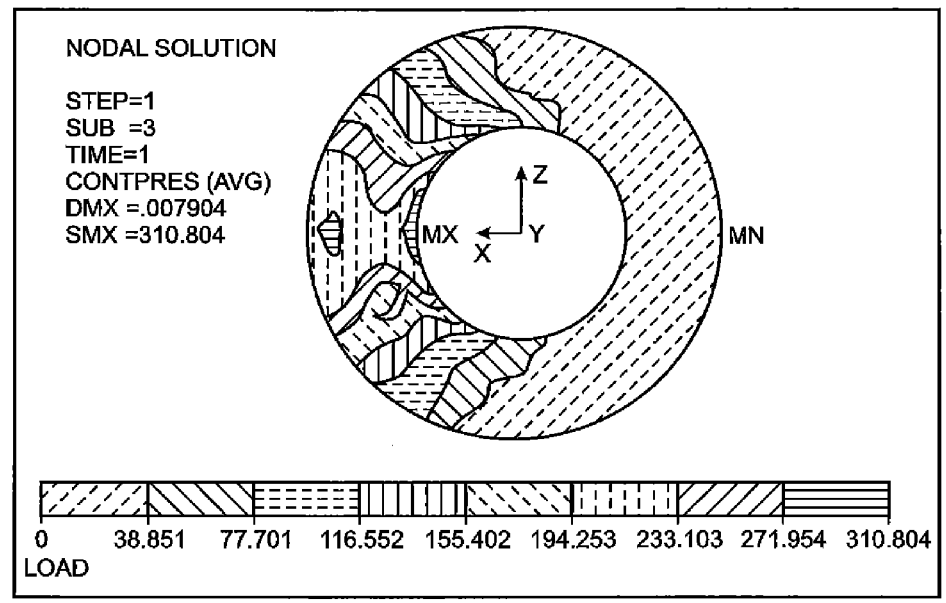
FIG. 4 shows the load distribution applied onto the creator tool during the step of making the frontal toothing.

By virtue of the described structure, the eccentric thrust exerted on the creator tool 11 by means of the head 23 is such to generate an instantaneous distribution of the stress thereon, which can be represented by the annular diagram shown in FIG. 4, in which the different stress intensity levels are represented on a grayscale.

In particular, the diagram in FIG. 4 shows how, according to the invention, the maximum stress exerted on tool 11, and thus in use by tool 11 on collar 10, is substantially located on the radially inner and outer edges of the annular diagram, and thus always only at the circumferential portion of the creator tool and applied each time by the eccentric thrust, while the minimum stress is located in a position diametrically opposite and substantially equal to zero.

Such an optimal distribution of stress and the functional "detachment" obtained between creator tool 11 and head 23 provided with orbital motion allow to obtain toothings 5 with high accuracy and dimensional constancy, with substantial advantages with respect to the prior art.

What we claim is:

1. A method of forming, by plastic deformation, a frontal toothing on an inner ring of a wheel hub, comprising:
    forming the inner ring of the wheel hub by joining of a spindle and an insert ring, the insert ring being fitted onto a side of the spindle;
    axially blocking the insert ring on the spindle by plastically deforming a first end of the spindle so as to form an upset collar therewith which axially protrudes from the insert ring such that the insert ring is located on a first axial side of the upset collar; and
    impressing the frontal toothing onto the upset collar on a second axial side, opposite to the first axial side thereof such that the frontal toothing is located on a side of the upset collar opposite to the insert ring; and wherein
    the operation of impressing the frontal toothing directly onto the upset collar is carried out sequentially after ending the operation of forming the upset collar, the operation of impressing the frontal toothing is carried out by a single, cylindrical-symmetry creator tool provided with a toothing which faces toward the upset collar and is complementary to that to be obtained, by axially impressing onto the upset collar, in sequence, one or more teeth of the complementary toothing by eccentrically pushing the creator tool against the upset collar while the creator tool is held substantially coaxial to the wheel hub, acting peripherally in sequence on the whole creator tool, wherein the creator tool is eccentrically pushed against the upset collar by using a pressing head frontally delimited by a conical surface, rotating the pressing head about a first axis (B) arranged inclined with respect to an axis of symmetry (A) of the wheel hub while simultaneously rotating the first axis (B), with precession motion, about the symmetry axis (A) of the wheel hub, the creator tool is eccentrically pushed against the upset collar in an indirect manner by a passive element interposed between the creator tool and an active element consisting of the pressing head and exerting an eccentric thrust on the passive element, wherein an elastically deformable, circular flat metal plate is used as the passive element which is frontally held against the creator tool, from a side opposite to the complementary toothing, the elastically deformable, circular flat metal plate having a peripherally outer, thinned edge thereof which protrudes past a corresponding radially outer edge of the creator tool and which is restrained by a restrain joint to a supporting structure of the creator tool.

2. The method according to claim 1, further comprising a flat, anti-wear plate directly fixed to the passive element and arranged between the passive element and the active element consisting of the pressing head.

3. The method according to claim 1, wherein the creator tool consists of a cylindrical metal block having a bottom base face provided with a complementary toothing and which is held with the bottom base face facing the collar only at a lateral wall thereof, by a supporting structure.

4. The method according to claim 1, wherein the wheel hub, during the step of impressing the creator tool against the upset collar, is both axially and radially supported and blocked with respect to the axis of symmetry thereof, and is further held angularly blocked with the inner ring thereof, so that it cannot rotate about the axis of symmetry.

5. The method according to claim 1, wherein the eccentric thrust exerted on the creator tool generates an instantaneous distribution of stress thereon that can be represented by an annular diagram, and wherein
    a maximum stress is substantially located on a radially inner and outer edges of the annular diagram, at a circumferential portion of the creator tool and applied each time by the eccentric thrust, and wherein
    a minimum stress is located in a diametrically opposite position and is substantially zero.

6. A method of forming, by plastic deformation, a frontal toothing on an inner ring of a wheel hub, comprising:
    forming the inner ring of the wheel hub by joining of a spindle and an insert ring, the insert ring being fitted onto a side of the spindle;
    axially blocking the insert ring on the spindle by plastically deforming a first end of the spindle so as to form an upset collar therewith which axially protrudes from the insert ring such that the insert ring is located on a first axial side of the upset collar; and
    impressing the frontal toothing onto the upset collar on a second axial side, opposite to the first axial side thereof such that the frontal toothing is located on a side of the upset collar opposite to the insert ring; and wherein
    the operation of impressing the frontal toothing directly onto the upset collar is carried out sequentially after ending the operation of forming the upset collar, the operation of impressing the frontal toothing is carried out by a creator tool provided-with a toothing which faces toward the upset collar and is complementary to that to be obtained, by axially impressing onto the upset collar, in sequence, one or more teeth of the complementary toothing by eccentrically pushing the creator tool against the upset collar while the creator tool is held substantially coaxial to the wheel hub, acting peripherally in sequence on the whole creator tool, wherein the creator tool is eccentrically pushed against the upset collar by using a pressing head frontally delimited by a conical surface, rotating the pressing head about a first axis (B) arranged inclined with respect to an axis of symmetry (A) of the wheel hub while simultaneously rotating the first axis (B), with precession motion, about the symmetry axis (A) of the wheel hub, the creator tool is eccentrically pushed against the upset collar in an indirect manner by a passive element interposed between the creator tool and an active element consisting of the pressing head and exerting an eccentric thrust on the passive element, a flat, anti-wear plate directly fixed to the passive element and arranged between the passive element and the active element consisting of the pressing head, further comprising a point (X) where the first axis (B) intercepts the axis of symmetry (A) of the wheel hub is chosen so as to be substantially coplanar with an upper surface of the anti-wear plate and directly faces the pressing head.

7. The method according to claim 6, further comprising an elastically deformable, circular flat metal plate is used as the passive element which is frontally held against the creator tool, from a side opposite to the complementary toothing, the elastically deformable, circular flat metal plate having a peripherally outer, thinned edge thereof which protrudes past a corresponding radially outer edge of the creator tool and which is restrained by a restrain joint to a supporting structure of the creator tool.

* * * * *